(12) United States Patent
Smith

(10) Patent No.: US 6,602,421 B2
(45) Date of Patent: *Aug. 5, 2003

(54) METHOD FOR PURIFYING CONTAMINATED GROUNDWATER USING STEEL SLAG

(76) Inventor: James S. Smith, 28 Grace's Dr., Coatesville, PA (US) 19320-1208

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,174

(22) Filed: Jul. 1, 1999

(65) Prior Publication Data

US 2001/0054588 A1 Dec. 27, 2001

(51) Int. Cl.$^7$ .................................................. C02F 1/58
(52) U.S. Cl. .................. 210/662; 210/681; 210/682; 210/683; 210/686; 210/688; 210/691; 210/747
(58) Field of Search ................................. 210/662, 681, 210/683, 684, 688, 747, 679, 686, 691, 682

(56) References Cited

U.S. PATENT DOCUMENTS

| | | | | |
|---|---|---|---|---|
| 4,221,648 A | * | 9/1980 | Martin ........................ | 210/748 |
| 4,300,985 A | | 11/1981 | Gagneraud .................... | 201/10 |
| 4,331,088 A | | 5/1982 | Gold ............................ | 110/346 |
| 4,367,986 A | | 1/1983 | Miyoshi et al. ............. | 405/266 |
| 4,377,483 A | | 3/1983 | Yamashita et al. .......... | 210/670 |
| 4,465,518 A | | 8/1984 | Miyoshi et al. ............. | 106/89 |
| 4,473,477 A | * | 9/1984 | Beall .......................... | 210/747 |
| 4,504,321 A | | 3/1985 | Kapland et al. ............ | 106/117 |
| 4,652,310 A | | 3/1987 | Tormari et al. ............. | 75/256 |
| 4,707,270 A | | 11/1987 | Kobayashi et al. ......... | 210/683 |
| 4,857,203 A | * | 8/1989 | Pope et al. .................. | 210/747 |
| 5,266,213 A | | 11/1993 | Gillham ....................... | 210/747 |
| 5,275,733 A | | 1/1994 | Burnham .................... | 210/609 |
| 5,304,710 A | | 4/1994 | Kigel et al. ................. | 588/257 |
| 5,417,861 A | | 5/1995 | Burnham .................... | 210/609 |
| 5,429,751 A | | 7/1995 | Hooykaas .................... | 210/751 |
| 5,430,235 A | | 7/1995 | Hooykaas et al. .......... | 588/252 |
| 5,492,565 A | | 2/1996 | Fujimasu .................... | 106/718 |
| 5,582,573 A | | 12/1996 | Weszely ....................... | 588/257 |
| 5,700,107 A | | 12/1997 | Newton ....................... | 405/128 |

OTHER PUBLICATIONS

Hankins, Deborah A., et al., "The Feasibility of Permeable Reactive Barriers for In Situ Groundwater Treatment: The Sunnyvale 'Iron Wall' and Beyond," IBC Conference on Subsurface Barrier Technologies, Tucson, Arizona, Jan. 26, 1997.

Chen, Chien T., In Situ Iron Enhanced Degradation of Organic Compounds in Groundwater.

Smith, James C. et al., "Steel Slag for Remediation of Contaminated Groundwater," Hazardous Industrial Wastes, Proceedings of the Thirteenth Mid–Atlantic Industrial Hazardous Waste Conference, Jul. 12–15, 1998.

Agrawal, Abinash et al., "Reduction of Nitro Aromatic Compounds by Zero–Valent Iron Metal," *Environ. Sci. Technol.*, 1996, vol. 30, pp. 153–160.

Powell, Robert M. et al., "Coupled Iron Corrosion and Chromate Reduction; Mechanisms for Subsurface Remediation," *Environ. Sci. Technol.*, 1995, vol. 29, pp. 1913–1922.

Orth, W. Scott et al., "Dechlorination of Trichloroethene in Aqueous Solution Using Fe$^0$," *Environ. Sci. Technol.*, 1996, vol. 30, pp. 66–71.

O'Hannesin, Stephanie F. et al., "Long–Term Performance of an In Situ 'Iron Wall' for Remediation of VOCs," pp. 164–170.

Gillham, Robert W., "In Situ Treatment of Groundwater: Metal–Enhanced Degradation of Chlorinated Organic Contaminants," M. M. Aral (ed.), *Advances in Groundwater Pollution Control and Remediation*, 1996 Fluwer Academic Publishers, pp. 249–274.

* cited by examiner

*Primary Examiner*—Ivars Cintins
(74) *Attorney, Agent, or Firm*—RatnerPrestia

(57) ABSTRACT

A method for purifying contaminated water involves passing contaminated water through a porous bed of steel slag. The steel slag can be used to remove various contaminants or reduce the concentration of such contaminants, such as heavy metals (for example, hexavalent chromium), chlorinated organic compounds, and certain inorganic anions. The method preferably involves placing an underground barrier of a porous bed of steel slag in a flow path of contaminated groundwater then allowing contaminated groundwater to pass through the barrier to purify the contaminated groundwater. The slag particles may be used as produced with no further grinding necessary, although the slag may be passed through a sieve or sieves to obtain a set of slag particles having a median diameter of about ⅛ inch to 1 inch, and preferably between about ¼ inch to ⅜ inch. Due to the inherent permeability of slag, no additive need be mixed with the slag. The method also contemplates periodically replacing the spent slag with fresh slag or placing another wall adjacent the first wall of slag.

12 Claims, No Drawings

METHOD FOR PURIFYING CONTAMINATED GROUNDWATER USING STEEL SLAG

FIELD OF THE INVENTION

The present invention pertains to the purification of contaminated groundwater and, more specifically, to the purification of groundwater having hexavalent chromium.

BACKGROUND OF THE INVENTION

Recently, zero-valent iron filings have been identified as a suitable constituent for use in permeable reaction wall technology to remove certain contaminants from groundwater. This technology uses a form of passive groundwater remediation which typically involves placing a reactive wall or barrier in the flow path of contaminated groundwater. According to this technology, iron filings are typically mixed with sand to allow for a suitable permeability of the reactive barrier. The wall thickness and permeability are selected to provide for an adequate residence time of the contaminated groundwater within the barrier to reduce certain contaminants in the water to a desired level, such as below drinking water levels. The wall is typically oriented perpendicular to the flow path of the groundwater.

In some cases, a "funnel and gate" configuration may be used. The "funnel" consists of a sealable joint sheet pile or slurry which directs contaminated water to the iron wall or a "gate" and also prevents untreated groundwater from flowing around the gate. The impermeable funnels allow containment and treatment of a contaminant flow path (or plume) without constructing an iron wall across the plume's entire width.

An advantage of this type of groundwater remediation is that there are very few operating and maintenance costs after the reactive barrier is installed. Groundwater monitoring before and after installation of the reactive barrier is required in order to verify the effectiveness. Permeable barrier remediation technology is a growing field and is anticipated to be a major cost-effective groundwater remediation methodology of the future.

It has been reported that the present cost of zero-valent iron in a particle size suitable for a permeable reactive wall is approximately $400 per ton. If the volume of the wall is large, the cost of the reactive zero-valent iron can be considerable. Moreover, iron filings may have other elements, such as sulfur, selenium, arsenic, cadmium, lead, copper, and mercury, in a form which allows them to leach relatively easily to the environment. In addition, iron filings tend to absorb carbon dioxide from air or tend to be reactive with carbonate ions or carbonic acid from aqueous solution to form insoluble carbonates, thereby reducing the permeability by the plugging action of carbonates. Therefore, it is desirable to identify a constituent which might be used as a permeable barrier to remediate or purify contaminated groundwater. Preferably, such a constituent is not as costly as iron filings, does not contain certain elements in a readily leachable form, and does not absorb carbon dioxide from air or react with carbonate or carbonic acid.

SUMMARY OF THE INVENTION

In view of its purposes, the present invention provides a method for purifying contaminated water comprising passing contaminated water through a porous bed comprising steel slag. It has been found that the porous bed may consist solely of steel slag, with no other constituent or filler, such as sand, mixed with the steel slag. Preferably, the method involves first providing an underground barrier comprising a porous bed of steel slag in a flow path or plume of contaminated groundwater then allowing the groundwater to pass through the barrier to purify the groundwater. The slag can be used as formed, with no further grinding needed, and preferably is sieved such that the slag used has particles with a median diameter within the range of about one-eighth of an inch to one inch and preferably from about one-quarter of an inch to three-quarters of an inch. The present invention is particularly well-suited to removing hexavalent chromium from contaminated groundwater.

It is to be understood that both the foregoing general description and the following detailed description are exemplary, but are not restrictive, of the invention.

DETAILED DESCRIPTION OF THE INVENTION

The present invention is directed to a method which utilizes steel slag as a permeable barrier within a flow path or plume of contaminated groundwater to purify the groundwater. Steel slag is the cooled, solidified co-product obtained in the process for making steel and is formed when steel-containing ores and/or scrap are treated and/or purified in a steel making furnace. In general, steel slag is itself a non-metallic product, consisting primarily of silicates and aluminosilicates of calcium and other bases that develop in a molten condition during steel making. The particular constituents and concentrations of those constituents vary depending on the process conditions of the steel furnace from which the slag is removed. Nonetheless, it is believed that any steel slag can be used in the present invention. Typically, steel slag has generally the following composition, although it varies as stated above:

| Constituent | Weight % |
| --- | --- |
| $SiO_2$ | 9–20 |
| CaO | 30–59 |
| $Al_2O_3$ | 0.1–2.5 |
| FeO | 5–20 |
| MgO | 0.6–8 |
| Sulfur (Reported as $SO_3$) | 0.15–0.62 |
| MnO | 1.3–10 |
| $TiO_2$ | 0.4–0.9 |
| $P_2O_5$ | 1.5–2.3 |

Steel slag can also include other constituents not listed above such as $Fe_2O_3$, $K_2O$, $Na_2O$, and $r_2O_3$.

The median particle size of the steel slag should be within a particular range. For example, if the median particle size is too large, then the overall surface area available for reaction with the contaminants is decreased, thereby decreasing the efficiency of the permeable wall. On the other hand, if the median particle size is too small, such as less than about one-eighth of an inch, then the fine particles might tend to cementitiously harden when formed into a wall and thereby become relatively impermeable to groundwater. The formation of an impermeable wall would be severely detrimental to the purification system in that the contaminated groundwater would find another route around the barrier and therefore would remain contaminated.

The steel slag used for the permeable wall may have a fairly broad distribution in particle size and can include the presence of very fine particles and large particles. In the case of a broad distribution, the presence of large particles would tend to limit the formation of regions of cementitious hardening otherwise caused by the small particles. The use of steel slag having a broad distribution is desirable for the reason that such slag requires less processing (i.e., little or no separation) before use as a permeable wall. On the other hand, the steel slag used for the permeable wall may have a fairly narrow distribution in particle size. The use of steel slag having a narrow distribution is desirable for the reason that such slag tends to have a more homogenous reactivity throughout the permeable wall.

Generally, the steel slag used should have particles with a median diameter of about one-eighth of an inch to one inch, and preferably between about one-quarter of an inch and three-eighths of an inch. To obtain steel slag particles of this size, the formed steel slag need not be crushed or ground, but can merely be sieved in a known way to achieve a set of particles having an average diameter within these ranges. In some cases, steel slag as formed can be used.

It has been found that the steel slag generally has a sufficiently high permeability (e.g., about $4.5 \times 10^{-2}$ cm/sec) to be the sole constituent in the porous bed. Moreover, it has been found that steel slag retains this high permeability even after water has passed through it. As mentioned above, in iron filings technology, the iron filings are typically mixed with sand before placed in a plume of contaminated groundwater. Because the permeable wall of the present invention is entirely the reactive material, the efficiency of the wall, measured as reactive sites per unit weight of wall, is increased as compared to a wall of iron filings.

The method of the present invention is used for purifying contaminated groundwater. As demonstrated below, steel slag has been shown to remove hexavalent chromium and trichloroethylene (TCE), two contaminants often found in groundwater. Although only these two contaminants have been tested and shown to be removed by steel slag, it is believed that the present invention can be used to remove other contaminants typically found in contaminated groundwater. Such contaminants can be categorized into three general groups: Chlorinated organic compounds, metal cations and anions, and inorganic anions. In addition to TCE, such chlorinated organic compounds also include perchloroethylene, 1,1,1-trichloroethane, and their respective breakdown products in groundwater. In addition to hexavalent chromium, other metal cations often found in contaminated groundwater include pentavalent arsenic, trivalent arsenic, hexavalent uranium, and trivalent selenium. Inorganic anions often found in contaminated groundwater include phosphate and nitrate.

As used herein, the phrase "purifying contaminated groundwater" means that at least some of the contaminants listed above are reduced by at least some extent. Although the mechanism of purification of the contaminants by the steel slag is not clearly known, it is presumed that steel slag serves to reduce metals such as hexavalent chromium and uranium to water insoluble substances and prevent their mobility, thus protecting groundwater. The present invention is particularly directed to reducing hexavalent chromium, and it is believed that the iron present in the steel slag serves to reduce hexavalent chromium. Accordingly, it is preferable in some cases to use a steel slag having a higher concentration of iron oxide, such as higher than 10% or even more preferably higher than 15% in situations where there is a high concentration of hexavalent chromium in the contaminated groundwater. In addition, it is believed that steel slag will adsorb metal ions of arsenic and selenium and therefore prevent their mobility in water solution as well. It is also believed that steel slag can render inorganic anions insoluble in water or adsorb the anions limiting their mobility in water solution. It is also believed that steel slag serves to degrade chlorinated organic substances that are soluble in groundwater. More generally, the presumed mechanisms listed in U.S. Pat. No. 4,377,483, incorporated herein by reference, might also be applicable here as listed below:

A. Adsorptive effect caused by $2CaO.SiO_2$ and phosphoric acid compounds;
B. Co-precipitation effect caused by Fe;
C. Precipitation effect caused by S;
D. Hydroxide precipitation effect caused by a high pH value (9.5 to 11.5); and
E. Ion substitution effect caused by CaO and MgO.

In implementing the method of the present invention, the well known teachings of permeable reaction wall technology, as used for zero-valent iron filings, are utilized. Some of these teachings are set forth, for example, in an article entitled "In situ Treatment of Groundwater: Metal-Enhanced Degradation of Chlorinated Organic Contaminants," Robert W. Gillham, M. M. Aral (Ed.), *Advances in Groundwater Pollution Control and Remediation,* pp. 249–274 (1996) and U.S. Pat. No. 5,266,213 to Gillham, both incorporated herein by reference.

In implementing the method of the present invention, a hydraulic evaluation of the groundwater flow is first made with equal potential lines used to show the flow path of the groundwater. In the hydraulic study, the type of aquifer material is analyzed and the average groundwater velocity is determined along with the typical range of the direction of flow, which might vary seasonally. The groundwater is then sampled at various sites for contaminants to determine the plume of contaminated groundwater. Then, column tests are conducted in the laboratory to determine the half lives of the various contaminants which are desired to be reduced. The number of half lives are determined to reduce the concentration of certain contaminants (e.g., TCE) from the amount present in the contaminated groundwater to the desired amount (such as a drinking level limit). The number of half lives are multiplied by the half life determined from the laboratory tests to provide a residence time, which in turn is multiplied by the flow rate of the groundwater to determine the thickness of the wall.

In analyzing the aquifer, it should be confirmed that the permeability of the wall of steel slag is about the same permeability as the aquifer so that the flow rate does not change dramatically across the permeable barrier. In order to approach the permeability of aquifer, the particle size of the steel slag can be reduced or increased within the ranges given above. As the particle size is increased, the permeability of the steel slag wall increases as well.

In order to place the permeable wall of steel slag in the ground, a ditch of the desired dimensions is excavated and is simply filled with steel slag then typically covered with the aquifer material. The steel slag may be added directly to the ditch with no permeable membrane. Alternatively, a permeable membrane, such as a geotextile material, may be placed within the ditch to separate the steel slag from the aquifer material, although this is not necessary.

After placement, the groundwater is again sampled to ensure that the contaminants have been adequately removed. The sampling should continue periodically over time to confirm that the steel slag remains active. At some point in time, typically a number of years, the steel slag would become spent in that it would no longer purify groundwater to an adequately low level of contaminants. In this event, an excavator can be used to simply remove the spent steel slag and lay some fresh steel slag in its place. Alternatively, a new ditch can be dug adjacent the spent steel slag and filled with fresh steel slag. As described in the '483 patent, treating groundwater with steel slag has the advantage that the heavy metals once adsorbed do not readily dissolve again so that the spent steel slag can be discarded without being a public hazard. For example, the spent steel slag can readily be solidified with an ordinary Portland cement or a blast furnace cement or a plaster. Alternatively, the spent steel slag can be used as an upper layer stabilizer.

Although steel slag contains certain elements, such as at least one of sulfur, selenium, arsenic, cadmium, lead, copper, and mercury, the form of the steel slag is such that these elements are less likely to leach from steel slag than from iron filings. In addition, steel slag contains calcium and magnesium that are released to aqueous environments which would increase the pH level to 10 or 11 and facilitate the removal of phosphates, arsenates, trivalent chromium, manganese, and aluminum and prevent plugging by bacterial growth. Moreover, steel slag is a glassy (amorphous) coarse material that maintains relatively high permeability (about $4.5 \times 10^{-2}$ cm/sec.) regardless of the amount of water passed through it. Finally, steel slag does not absorb carbon dioxide from air or react with carbonates or carbonic acid from aqueous solution to form insoluble carbonates.

The following examples are included to more clearly demonstrate the overall nature of the invention. These examples are exemplary, not restrictive, of the invention.

EXAMPLES

Example 1

Four different samples of $-\frac{3}{8}"$ steel making slag from the Weirton Steel Company, Weirton, W.Va., were placed in a 2" diameter by 60" long acrylic tubes, mounted vertically. $-\frac{3}{8}"$ steel making slag is slag which has been sieved to number four mesh and the slag had a particle gradation as shown below:

| Particle Size Gradation | |
| --- | --- |
|  | Weirton Slag |
| Finer than #4 mesh | 100.0% |
| Finer than #8 mesh | 73.8% |
| Finer than #16 mesh | 45.4% |
| Finer than #40 mesh | 23.2% |
| Finer than #100 mesh | 9.8% |
| Finer than #200 mesh | 4.9% |

As is clear from this gradation, the median particle size of this steel slag is well below the lower limit of the range given above, namely ⅛ inch. Accordingly, this steel slag would first be mixed with slag having larger particles (or not sieved in the first place) before it is used as a permeable wall and placed underground to purify groundwater. The quantitative analysis of the steel making slag from Weirton Steel is shown below.

| Major Constituents | Weight Percent |
| --- | --- |
| $Al_2O_3$ % | 4.82 |
| CaO % | 36.51 |
| FeO % | 10.96 |
| $Fe_2O_3$ % | 15.06 |
| MgO % | 8.69 |
| MnO % | 4.26 |
| $SiO_2$ % | 13.30 |
| $P_2O_5$ % | 0.58 |
| $SO_3$ % | 1.41 |
| $TiO_2$ % | 0.44 |
| $K_2O$ % | 0.10 |
| $Na_2O$ % | 0.14 |
| $Cr_2O_3$ % | 0.16 |
| LOI % | 3.98 |
| Moisture % | 0.47 |

The method of analysis was sample digestion-lithium metaborate fusion.

A five parts per million hexavalent chromium solution as sodium dichromate in distilled water was passed through the slag samples at an approximate rate of 1 ml/min. The concentration of hexavalent chromium and the discharge from each tube was measured and found to be less than 0.02 mg/l (ppm). The test was stopped when hexavalent chromium discharge levels reached 0.1 mg/l hexavalent chromium. The results of the tests are shown in the table below.

| EXAMPLE 1 | | | | | |
| --- | --- | --- | --- | --- | --- |
|  | Control (Sand) | 1 | 2 | 3 | 4 |
| Slag in column (grams) | 1718 | 1859 | 1859 | 2500 | 2500 |
| Treated before breakthrough (liters) | 0.173 | 34.3 | 25.5 | 24.5 | 17.0 |
| Total $Cr^{+6}$ immobilization (milligrams) | 0.86 | 171.5 | 127.5 | 122.5 | 85.0 |
| Total $Cr^{+6}$ immobilization (milligrams/kilograms slag) | 0.5 | 92.3 | 68.6 | 49.0 | 34.0 |
| Total $Cr^{+6}$ immobilization (pounds/ton slag) | 0.0001 | 0.184 | 0.137 | 0.098 | 0.068 |

As indicated in the above table, there is significant variation in the volume of hexavalent chromium solution fed through the columns before "breakthrough" occurred. This is due to the use of differing quantities of sample and of sample particle size. In each case, it is seen that significant quantities of hexavalent chromium have been immobilized by the slag. A control sample of mason's sand was included for comparative purposes.

Example 2

A test series, as in Example 1, was carried out using steel slag samples from the Wheeling Pittsburgh Steel Co., Steubenville, Ohio. This material was also $-\frac{3}{8}"$ in particle gradation and had a particle gradation as shown below:

| Particle Size Gradation | |
|---|---|
| | Wheeling Pittsburgh Slag |
| Finer than #4 mesh | 97.3% |
| Finer than #8 mesh | 79.3% |
| Finer than #16 mesh | 58.4% |
| Finer than #40 mesh | 35.7% |
| Finer than #100 mesh | 20.0% |
| Finer than #200 mesh | 12.1% |

As is clear from this gradation, the median particle size of this steel slag is well below the lower limit of the range given above, namely ⅛ inch. Accordingly, this steel slag would first be mixed with slag having larger particles (or not sieved in the first place) before it is used as a permeable wall and placed underground to purify groundwater. The major constituents are shown below.

| Major Constituents | Slag for Column Test $Cr^{+6}$ (−80 mesh) |
|---|---|
| $Al_2O_3$ % | 4.48 |
| CaO % | 34.14 |
| FeO % | 14.15 |
| $Fe_2O_3$ % | 13.28 |
| MgO % | 8.29 |
| MnO % | 3.19 |
| $SiO_2$ % | 16.04 |
| $P_2O_5$ % | 0.46 |
| $SO_3$ % | 1.22 |
| $TiO_2$ % | 0.54 |
| $K_2O$ % | 0.12 |
| $Na_2O$ % | 0.16 |
| $Cr_2O_3$ % | 0.12 |
| LOI % | 4.22 |
| Moisture % | 0.53 |

The same quantitative analysis method was used as in Example 1.

As the data in the table below shows, this slag also captured significant quantities of hexavalent chromium.

| EXAMPLE 2 | | | | | |
|---|---|---|---|---|---|
| | Control (Sand) | 1 | 2 | 3 | 4 |
| Slag in column (grams) | 1718 | 2189 | 2189 | 2500 | 2500 |
| Treated before breakthrough (liters) | 0.173 | 26.9 | 18.2 | 12.0 | 21.2 |
| Total $Cr^{+6}$ immobilization (milligrams) | 0.86 | 134.5 | 91.0 | 60.0 | 106.0 |
| Total $Cr^{+6}$ immobilization (milligrams/kilograms slag) | 0.5 | 61.4 | 41.6 | 24.0 | 42.4 |
| Total $Cr^{+6}$ immobilization (pounds/ton slag) | 0.0001 | 0.123 | 0.083 | 0.048 | 0.085 |

Example 3

The slag material used was the Wheeling Pittsburgh slag, which was passed through a window screen and placed onto a 30 mesh brass sieve. The material of particle size less than 600 microns was removed. The slag material with a particle size greater than 600 microns and less than 2 mm was used in both examples 3 and 4. As in the previous examples, although the size of the slag is too small to be used as a permeable barrier wall, it is utilized here to model the removal by slag of hexavalent chromium.

A small amount of glass wool was placed in a 50 ml burette just above the stopcock to prevent the slag material from plugging the stopcock. Groundwater from the Corby Street Spring in Cortdale, Pa. was used and approximately 55 grams of the slag were placed in this groundwater and then poured into the burette. The water level was lowered to the top of the slag before 100 ppb of hexavalent chromium solution was added to the top of the slag. The hexavalent chromium solution was formed by adding 4.00 ml of 50 ppm standard solution of hexavalent chromium as $K_2CR_2O_7$-Hach Company of Loveland, Colo., using a 5 ml syringe and diluting with 200 ml of water. The solution was added to the top of the column. 200 ml aliquots of solution were taken from the column and tested for hexavalent chromium by using method number 8023 including a DR-100 Colorimeter from the Hach Company and Chromaver 3 pillows of diphenylcarbohydrazide, also from the Hach Company. More specifically, the solution was first filtered and one Hach chromaver pillow was added to the graduated cylinder. The solution was shaken by inversion ten times and left to stand for ten minutes to develop the color reaction. The colorimeter was set to zero with groundwater and then the color was read in the colorimeter. The rate of flow through the column was 1 ml/min.

Using this example, it was determined that the slag had a breakthrough volume of 1800 ml of 100 ppb $Cr^{+6}$ solution. Breakthrough volume is defined as the amount of liquid that runs through the column before hexavalent chromium emerges. The 200 ml aliquot from 1,900 ml to 2,100 ml was sent to Envirotech Research, Inc. in Edison, N.J., to measure total chromium. The result of this aliquot was 18 ppb. Apparently, the species of chromium is mainly hexavalent chromium with the reduced chromium staying trapped on the column material by filtration or adsorption. The pH of the effluent was 10.

Example 4

A test was also used to determine whether slag would remove trichrolethylene (TCE) from groundwater. In this test, three separate experiments were run and the same slag was used as in Example 3 except for Experiment C in which the particle size used was less than 600 microns (i.e., the slag material that passed through the 30 mesh sieve).

In these experiments, 10 grams of the slag or sand or electrolytic iron were weighed onto a 40 ml vial. 20 ml of groundwater were added to the vial using a graduated cylinder. Then 20 microl of 1500 ppm TCE in methanol stock solution were injected into the vial beneath the water. The 1500 ppm TCE and methanol solution was produced by adding 100 μl of pure TCE to 100 ml of methanol using 100 ml graduated cylinder. Thus, the approximate concentration of TCE in the water inside the vial was 1.5 ppm (wt./vol.). The density of TCE is 1.46 grams/ml. The vial was immediately capped. The capped vial was shaken occasionally for one to several days. The vial was sampled only once. The sample was a headspace air sample taken by puncturing the septum with a 25 ml gas syringe and extracting a 10 ml gas sample. The gas sample was injected into a Perkin-Elmer 3920 gas chromatograph using the following conditions:

1. Column 6'×⅛" OD stainless steel packed with 20% SP-2100 and 0.1% carbowax on Supelcoport.
2. Column temperature 90° C. isothermal.
3. Injection port temperature 200° C.
4. Interface temperature 200° C.
5. Electron capture nickel[63] detector temperature 250° C.
6. Column flow 35 ml/min.
7. Column gas 95% argon and 5% methane.

The retention time for TCE was about 1.6 minutes and the peak area of the TCE peak was measured using a Hewlett-Packard 3396A integrator.

The results are given in units of area for the TCE response on a gas chromatograph. The lower the value means that there is less TCE. Sand was used as a blank, or unreactive material, in the 40 ml vial for comparison with electrolytic iron and slag. The percentage values provided in the "slag" and "iron" columns represent the amount of TCE in these materials compared to the amount of TCE in sand.

EXPERIMENT A

| DAY | SAND | SLAG (fines) | IRON |
|---|---|---|---|
| | Response to TCE (1.5 ppm initial concentration) | | |
| 1 | 113 | 100 (93%) | 96 (89%) |
| 2 | 118 | 72 (67%) | 26 (24%) |
| 3 | 101 | 59 (55%) | 7 (6%) |
| 4 | 103 | 57 (53%) | 9 (8%) |
| 5 | 105 | 63 (58%) | 5 (5%) |

EXPERIMENT B

| DAY | SAND | SLAG (C-Scrap) | IRON |
|---|---|---|---|
| | Response to TCE (1.5 ppm initial concentration) | | |
| 1 | 82 | 78 | 54 |
| 2 | — | 60 | 28 |
| 3 | 81 | 48 | 8 |
| 4 | 94 | 51 | 8 |

EXPERIMENT C

| DAY | SAND | SLAG (C-Scrap) | SLAG (C-Scrap) |
|---|---|---|---|
| | Response to TCE (1.5 ppm initial concentration) | | |
| 2 | 106 | 84 | 76 |
| 3 | 117 | 65 | 49 |
| 4 | 106 | 53 | 51 |
| 5 | 102 | 52 | 35 |

As can be seen from the tables labeled Experiments A–C, it can be concluded that slag removes TCE from groundwater.

Although illustrated and described herein with reference to certain specific embodiments and examples, the present invention is nevertheless not intended to be limited to the details shown. Rather, the claims should be read to include various modifications within the scope and range of equivalents of the claims, which are nevertheless within the true spirit of the invention.

What is claimed is:

1. A method for purifying contaminated water having chlorinated organic compounds, metal cations and anions, and inorganic anions, the method consisting of forming steel slag and passing the contaminated water through a porous bed consisting of a plurality of particles of steel slag of different sizes, wherein said steel slag: (1) comprises at least 10% FeO; (2) has a median particle diameter of about ¼ inch to ⅜ inch; and (3), as formed, reduces the concentration of the chlorinated organic compounds, the metal cations and anions, and the inorganic anions in the contaminated water, and wherein said particles of said steel slag are individually intermixed prior to formation of said porous bed.

2. The method of claim 1, wherein said steel slag comprises at least 15% FeO.

3. The method of claim 1, wherein said steel slag comprises:

| | |
|---|---|
| $Al_2O_3$ % | 4.82 |
| CaO % | 36.51 |
| FeO % | 10.96 |
| $Fe_2O_3$ % | 15.06 |
| MgO % | 8.69 |
| MnO % | 4.26 |
| $SiO_2$ % | 13.30 |
| $P_2O_5$ % | 0.58 |
| $SO_3$ % | 1.41 |
| $TiO_2$ % | 0.44 |
| $K_2O$ % | 0.10 |
| $Na_2O$ % | 0.14 |
| $Cr_2O_3$ % | 0.16. |

4. The method of claim 1, wherein said steel slag comprises:

| | |
|---|---|
| $Al_2O_3$ % | 4.88 |
| CaO % | 34.14 |
| FeO % | 14.15 |
| $Fe_2O_3$ % | 13.28 |
| MgO % | 8.29 |
| MnO % | 3.19 |
| $SiO_2$ % | 16.04 |
| $P_2O_5$ % | 0.46 |
| $SO_3$ % | 1.22 |
| $TiO_2$ % | 0.54 |
| $K_2O$ % | 0.12 |
| $Na_2O$ % | 0.16 |
| $Cr_2O_3$ % | 0.12. |

5. A method for purifying contaminated water having chlorinated organic compounds, metal cations and anions, and inorganic anions, the method consisting of forming steel slag and passing the contaminated water through a porous bed retained by a permeable membrane and consisting of a plurality of particles of steel slag of different sizes, wherein said steel slag: (1) comprises at least 10% FeO; (2) has a median particle diameter of about ¼ inch to ⅜ inch; and (3), as formed, reduces the concentration of the chlorinated organic compounds, the metal cations and anions, and the inorganic anions in the contaminated water, and wherein said particles of said steel slag are individually intermixed prior to formation of said porous bed.

6. A method for purifying contaminated groundwater having chlorinated organic compounds, metal cations and anions, and inorganic anions, the method consisting of the steps of:

forming steel slag;
providing an underground barrier wall consisting of a porous bed of a plurality of particles of the steel slag of different sizes in a flow path of the contaminated groundwater, wherein said steel slag: (1) comprises at least 10% FeO; (2) has a median particle diameter of about ¼ inch to ⅜ inch; and (3), as formed, reduces the concentration of the chlorinated organic compounds, the metal cations and anions, and the inorganic anions in the contaminated water, and wherein said particles of said steel slag are individually intermixed prior to formation of said porous bed; and
passing said contaminated groundwater through said barrier wall to purify said contaminated groundwater.

7. The method of claim 6, wherein said steel slag comprises at least 15% FeO.

8. The method of claim 6, wherein said steel slag comprises:

| | |
|---|---|
| $Al_2O_3$ % | 4.82 |
| CaO % | 36.51 |
| FeO % | 10.96 |
| $Fe_2O_3$ % | 15.06 |
| MgO % | 8.69 |
| MnO % | 4.26 |
| $SiO_2$ % | 13.30 |
| $P_2O_5$ % | 0.58 |
| $SO_3$ % | 1.41 |
| $TiO_2$ % | 0.44 |
| $K_2O$ % | 0.10 |
| $Na_2O$ % | 0.14 |
| $Cr_2O_3$ % | 0.16. |

9. The method of claim 6, wherein said steel slag comprises:

| | |
|---|---|
| $Al_2O_3$ % | 4.88 |
| CaO % | 34.14 |
| FeO % | 14.15 |
| $Fe_2O_3$ % | 13.28 |
| MgO % | 8.29 |
| MnO % | 3.19 |
| $SiO_2$ % | 16.04 |
| $P_2O_5$ % | 0.46 |
| $SO_3$ % | 1.22 |
| $TiO_2$ % | 0.54 |
| $K_2O$ % | 0.12 |
| $Na_2O$ % | 0.16 |
| $Cr_2O_3$ % | 0.12. |

10. A method for purifying contaminated groundwater having chlorinated organic compounds, metal cations and anions, and inorganic anions, the method consisting of the steps of:
forming steel slag;
providing an underground barrier wall consisting of a permeable membrane and a porous bed of a plurality of particles of the steel slag of different sizes in a flow path of the contaminated groundwater, wherein said porous bed is retained by said permeable membrane and said steel slag: (1) comprises at least 10% FeO; (2) has a median particle diameter of about ¼ inch to ⅜ inch; and (3), as formed, reduces the concentration of the chlorinated organic compounds, the metal cations and anions, and the inorganic anions in the contaminated water, and wherein said particles of said steel slag are individually intermixed prior to formation of said porous bed; and
passing said contaminated groundwater through said barrier wall to purify said contaminated groundwater.

11. A method for purifying contaminated groundwater having chlorinated organic compounds, metal cations and anions, and inorganic anions, the method consisting of the steps of:
forming steel slag;
providing an underground barrier wall consisting of a porous bed of a plurality of particles of steel slag of different sizes in a flow path of contaminated groundwater, wherein said steel slag: (1) comprises at least 10% FeO; (2) has a median particle diameter of about ¼ inch to ⅜ inch; and (3), as formed, reduces the concentration of the chlorinated organic compounds, the metal cations and anions, and the inorganic anions in the contaminated water, and wherein said particles of said steel slag are individually intermixed prior to formation of said porous bed;
passing said contaminated groundwater through said barrier wall to purify said contaminated groundwater;
periodically sampling said groundwater; and
replacing said steel slag with fresh steel slag.

12. A method for purifying contaminated groundwater having chlorinated organic compounds, metal cations and anions, and inorganic anions, the method consisting of the steps of:
forming steel slag;
providing an underground barrier wall consisting of a porous bed of a plurality of particles of steel slag of different sizes in a flow path of contaminated groundwater, wherein said steel slag: (1) comprises at least 10% FeO; (2) has a median particle diameter of about ¼ inch to ⅜ inch; and (3), as formed, reduces the concentration of the chlorinated organic compounds, the metal cations and anions, and the inorganic anions in the contaminated water, and wherein said particles of said steel slag are individually intermixed prior to formation of said porous bed;
passing said contaminated groundwater through said barrier wall to purify said contaminated groundwater;
periodically sampling said groundwater; and
placing a second underground barrier of fresh steel slag adjacent said underground barrier wall.

* * * * *

UNITED STATES PATENT AND TRADEMARK OFFICE
CERTIFICATE OF CORRECTION

PATENT NO. : 6,602,421 B2
DATED : August 5, 2003
INVENTOR(S) : James S. Smith

It is certified that error appears in the above-identified patent and that said Letters Patent is hereby corrected as shown below:

Title page,
Insert the following:
-- [73] Assignee: International Mill Service, Inc., Horsham, PA --

Column 10,
Line 40, "$Al_2O_3$%     4.88" should read -- $Al_2O_3$%     4.48 --

Column 11,
Line 38, "$Al_2O_3$%     4.88" should read -- $Al_2O_3$%     4.48 --

Signed and Sealed this

Third Day of August, 2004

JON W. DUDAS
*Acting Director of the United States Patent and Trademark Office*